United States Patent [19]

Edwards

[11] Patent Number: 5,142,506

[45] Date of Patent: Aug. 25, 1992

[54] ULTRASONIC POSITION LOCATING METHOD AND APPARATUS THEREFOR

[75] Inventor: Bruce H. Edwards, Santa Clara, Calif.

[73] Assignee: Logitech, Inc., Fremont, Calif.

[21] Appl. No.: 601,942

[22] Filed: Oct. 22, 1990

[51] Int. Cl.[5] .............................................. G01S 3/80
[52] U.S. Cl. .................................... 367/127; 367/907
[58] Field of Search ............... 367/907, 127, 129, 117, 367/98, 902; 178/18, 19

[56] References Cited

U.S. PATENT DOCUMENTS

| | | | |
|---|---|---|---|
| 3,134,099 | 5/1964 | Woo | 367/907 |
| 3,626,483 | 12/1971 | Whetstone et al. | 367/137 |
| 4,012,588 | 3/1977 | Davis et al. | 367/907 |
| 4,124,838 | 11/1978 | Kiss | 367/907 |
| 4,357,672 | 11/1982 | Howells et al | 367/127 |
| 4,891,474 | 1/1990 | Kelly | 367/907 |
| 4,933,915 | 6/1990 | Bostrom | 367/127 |
| 4,956,824 | 9/1990 | Sindeband et al. | 367/907 |
| 4,991,148 | 2/1991 | Gilchrist | 367/907 |
| 4,991,148 | 2/1991 | Gilchrist | 367/907 |
| 5,009,277 | 3/1991 | Sindeband et al. | 367/907 |
| 5,043,950 | 8/1991 | Schorum et al. | 367/907 |

Primary Examiner—Daniel T. Pihulic
Attorney, Agent, or Firm—Townsend and Townsend

[57] ABSTRACT

A positional locating method and apparatus (10) for measuring distances by accurately determining the transit time of ultrasonic wave bursts (22) between two or more points is disclosed. Timer clocks (60), (62), (64) and (66) are started when each of the bursts (22) is triggered to be emitted from a transmission point (14), and are stopped when a highly defined point (56) in the burst (22) is received at a corresponding receiving point (32), (34), (36) and (38). The highly defined point (56) is determined by first analyzing the burst (22) to identify a particular cycle (54) within the burst (22). That particular cycle (54) is then analyzed to detect the specific point (56) within the cycle (54). Use of multiple transmitters (9312), (9314) and (9316) or receivers (932), (934) and (936) permits the dimensions using ordinary trigonometric calculations. The calculation of position within two or three physical inventive method also has sufficient resolution to permit the calculation of attitudinal data by detecting very fine positional differences in a plurality of reference points located at relatively close distances on a movable marker device (912).

33 Claims, 6 Drawing Sheets

ULTRASONIC POSITION LOCATING METHOD AND APPARATUS THEREFOR

TECHNICAL FIELD

The present invention relates generally to position sensing devices and more particularly to a means for using ultrasonic signals to locate a reference device in three dimensions and/or to detect the attitudinal orientation of the reference device. The predominant current usage of the ultrasonic position locating device of the present invention is for digitizing positional information as a means of data input into a digital computer.

BACKGROUND ART

As the power of computers has rapidly increased, it has become obvious that a major limitation to the usefulness of computers involves the difficulty of entering data. As a result, numerous devices and schemes for data input and user interface have been developed. Many of these have utilized the idea of transferring positional information into digital format. Usually, a pointer or other device, sometimes called a marker, is used as an instrument for indicating the position of interest (although some devices have sought to detect the position of a pointed finger, or the like). A distinction is sometimes made between "mouse" type devices which control a cursor on a computer screen relative to marker movements and "digitizer" devices which impart positional data to a computer based upon marker position within a work surface area or the like. However, such a distinction primarily reflects differences in applications rather than in the devices themselves. Indeed, while a mouse type application generally does not require the high resolution or accuracy required of a digitizer type application, if a position locating devices is sufficiently accurate, it might be used in either type of application with appropriate supporting software.

Some such devices have employed any of several common intermediate steps. For instance, positional information has first been converted into variations of capacitance, voltage, inductance, frequency, signal phase, or the like. The intermediate analog is then converted, by conventional means, into a digital signal of a format suitable for digital computer input. This sort of positional "digitizer" has been universally accepted as a valuable input device type in many applications. The complication in this scheme is that it has proven to be very difficult to accurately interpret the position of a marker and to convert it into an intermediate analog. Among the many methods which have been used for this purpose have been devices which rely upon 14 variations in magnetic field strength and those which convert mechanical position into an electrical analog by means of movable coils or the like. This brief overview by no means purports to be a complete listing of the means which have been employed in the field, but each such means has suffered from at least one problem which has made it less than totally desirable. For instance, devices which rely upon variations in magnetic fields are overly susceptible to interference from stray fields, and electromechanical devices are prone to wear out or break, and are usually bulky and/or difficult to manipulate.

One solution that has been tried involves the use of ultrasonic waves. Briefly, since the speed of sound in a given environment can be determined with considerable accuracy, the time which it takes a sound wave to travel between two points is a good indicator of the distance between those points. Therefore, if a sound is emitted from a movable marker and the time taken for that sound to travel to two stationary receivers is determined, the relative position of the marker in two dimensions can be ascertained using simple trigonometric calculations. Use of three stationary references can allow three dimensional analysis. The same principles also apply if the transmitter/receiver functions are reversed, with the stationary references being the transmitters and the movable marker being the receiver. An example of this type of position determining apparatus is found in U.S. Pat. No. 4,758,691 issued to De Bruyne.

By way of example, De Bruyne and related prior art teach that ultrasonic pulses can be used to calculate distance by starting a high speed counter simultaneously with the emission of a pulse from a movable marker, and then stopping the counter when the pulse is received at one or more stationary positions. Further, since the speed of sound will vary somewhat with temperature and barometric pressure, in order for this measurement to be more accurate, some prior art methods have included means for adjusting measurements to correspond to the speed of sound under extant conditions. A common method has been to use a thermistor to determine ambient temperature, and to adjust a variable quantity accordingly in subsequent calculations.

While the sound wave pulse timing method has been widely employed in a variety of forms, it is recognized that certain qualities of sound waves and of the environments in which such devices are used impose appreciable limitations on the potential accuracy of such devices. The most basic such limitation involves the difficulty of precisely detecting a specific point in a received pulse which can be used as an accurate marker point in the signal. The solution taught by De Bruyne was to use a rapidly rising initial wave shape to create an acoustic shock wave. While this solution did offer an increase in attainable resolution it also created an undesirable audible tone at the frequency of repetition of the shock wave, and the resolution was still not as precise as is desired for many applications.

Yet another approach is exemplified by the teachings of U.S. Pat. No. 4,862,152 issued to Milner. Milner teaches a method for approximating the detection of a point in a series of individual cycles of a wave form within a pulse using a low pass filter to create an envelope wave shape of the pulse. A relative magnitude of this envelope is then used as a trigger point. Of course, since the accuracy of this method is entirely dependent upon the recognition of the appropriate trigger point magnitude, and since the magnitude of a received sound pulse falls off with the square of the distance over which it must travel, a means must be included for adjusting for the distance the sound pulse must travel. Milner used, for this purpose, a ramp voltage which increased in magnitude with time. The ramp voltage was then used to modify the gain of a receiving amplifier such that, the longer the time between emission and reception of the pulse, the greater the instantaneous gain of the amplifier. While this method has provided several significant advances in the field, it is still not as accurate as might be desired, since it does not identify with sufficient precision an exact point within a received pulse to accurately trigger the stopping of counters. Furthermore, this method is still quite prone to error caused by ambient noise interference, since it is entirely magnitude dependent.

All of the prior art methods for determining position using ultrasonic waves or pulses within the inventor's knowledge have not been capable of the fine resolution of which the present invention is capable, and/or have been less reliable than the inventive method, and/or have produced undesirable side effects such as unwanted audible noise.

No prior art positioning determining methods to the inventor's knowledge has successfully provided a means for determining position with sufficient high resolution to allow attitudinal measurements or to allow positional measurement to the degree of accuracy desired for many applications. All successful applications to date have been either too inaccurate or too unreliable for practical application.

DISCLOSURE OF INVENTION

Accordingly, it is an object of the present invention to provide a position digitizing means which can accurately locate a pointer device within at least three degrees of freedom.

It is another object of the present invention to provide a position digitizing means which can accurately provide information regarding attitudinal orientation in addition to positional information.

It is still another object of the present invention to provide a highly accurate means for distance measurement using an ultrasonic wave timing method, which will enable fine distinctions capable of conveying both positional and attitudinal measurements.

It is yet another object of the present invention to provide a means of making precise distance measurements using ultrasonic wave means which does not produce irritating audible effects.

It is still another object of the present invention to provide a means for precisely measuring distance which is not overly susceptible to error due to any ambient noise or interference effects.

It is a further object of the present invention to provide a means of accurately measuring distance using ultrasonic waves which is inexpensive to manufacture.

It is still another object of the present invention to provide a means for converting positional information into digital format which can be used for positional data input applications as well as for mouse type applications.

It is yet another object of the present invention to provide a means for accurately measuring distance for computer input which is reliable in operation.

Briefly, the preferred embodiment of the present invention is an ultrasonic position locating method which utilizes conventional mathematics and means for determining the position of a movable marker relative to a plurality of fixed reference points. The present invention differs from any prior art in its method for precisely determining the exact time elapsed between the triggering of an ultrasonic signal and the reception of that signal at a receiving position. Also, the present invention is distinguished by the fact that it does not produce an unwanted audible signal component. The degree of precision provided by the present invention allows for the practical application of fine distinctions between movable component part positions so as to accomplish the interpretation of attitudinal as well as positional information.

The high degree of precision achieved by the present invention is accomplished by providing a means for identifying a particular one of a series of cycles of an ultrasonic wave burst and then by identifying a particular point in that cycle. The particular cycle of interest is identified by setting an identifying threshold level based upon a just previous peak wave amplitude. In the presently preferred embodiment of the invention, the zero crossing point of the wave cycle of interest is chosen as the identification point of interest. While this latter decision is somewhat arbitrary, and any particular point on the wave could serve as an identifying point, it should be noted that the zero crossing point can be somewhat more precisely defined than can other points. Further, the zero crossing point can be somewhat more precisely identified due to the fact that the slope of the wave cycle is essentially vertical with respect to a decision threshold voltage at the zero crossing point. Also, this frequency was chosen specifically to best match the characteristics of the emitting transducer 14. Also, the zero crossing point does not vary in time due to changes in amplitude of received signal.

The inaudible quality of the present invention is achieved by using an ultrasonic burst which gradually ramps up and down, thus preventing the formation of a shock wave at the outset of each such burst, which shock wave would be audible since the frequency of occurrence of the bursts is within the audible spectrum.

A first presently preferred embodiment of the present invention uses a single ultrasonic transmitter located on a movable marker and four stationary ultrasonic receivers. Three ultrasonic receivers enable the calculation of the marker position in three dimensions. The fourth stationary receiver, placed in line with two of the others, provides a means for measuring the extant speed of sound.

An equally preferred alternate embodiment of the present invention uses three stationary ultrasonic transmitters and a single stationary ultrasonic receiver. Also, three additional ultrasonic receivers are mounted on a single movable marker. The single stationary receiver, being placed at a known distance from the stationary ultrasonic transmitters, provides a means for measuring the extant speed of sound. The combination of stationary transmitters and a movable reference with three receiving points provides sufficient data points to provide information relating to six degrees of freedom (regarding X, Y, and Z positional axis as well as pitch, roll and yaw attitudinal data).

An advantage of the present invention is that a movable marker can be accurately located within two or three dimensions with a higher degree of accuracy than has been previously practical.

Yet another advantage of the present invention is that positional information can be determined with sufficient accuracy to make practical the interpretation of attitudinal information as well as positional information.

Still another advantage of the present invention is that precise distance determinations can be made without causing unwanted audible side effects.

Yet another advantage of the present invention is that the inventive means for precisely measuring distance is not overly susceptible to extraneous noise or interference effects.

Still another advantage of the present invention is that the inventive means for accurately measuring distance using ultrasonic waves is inexpensive to manufacture.

Yet another advantage of the present invention is that the inventive means for accurately measuring distance using ultrasonic waves is reliable and consistent in operation.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is a digital computer input device having ultrasonic transmitting and receiving means and means for accurately determining time of travel of an ultrasonic wave between the transmitting and receiving means. Further, the best presently known embodiment of the present invention includes calculating means for determining a position based upon the sound wave transit times between the transmitting and receiving means. The predominant expected usage of the inventive ultrasonic position locating method is in the data processing industry, particularly in the data input portion of interactive computer devices wherein accurate and effortless conversion of positional information into digital-computer-usable data is desirable.

Figure 1:
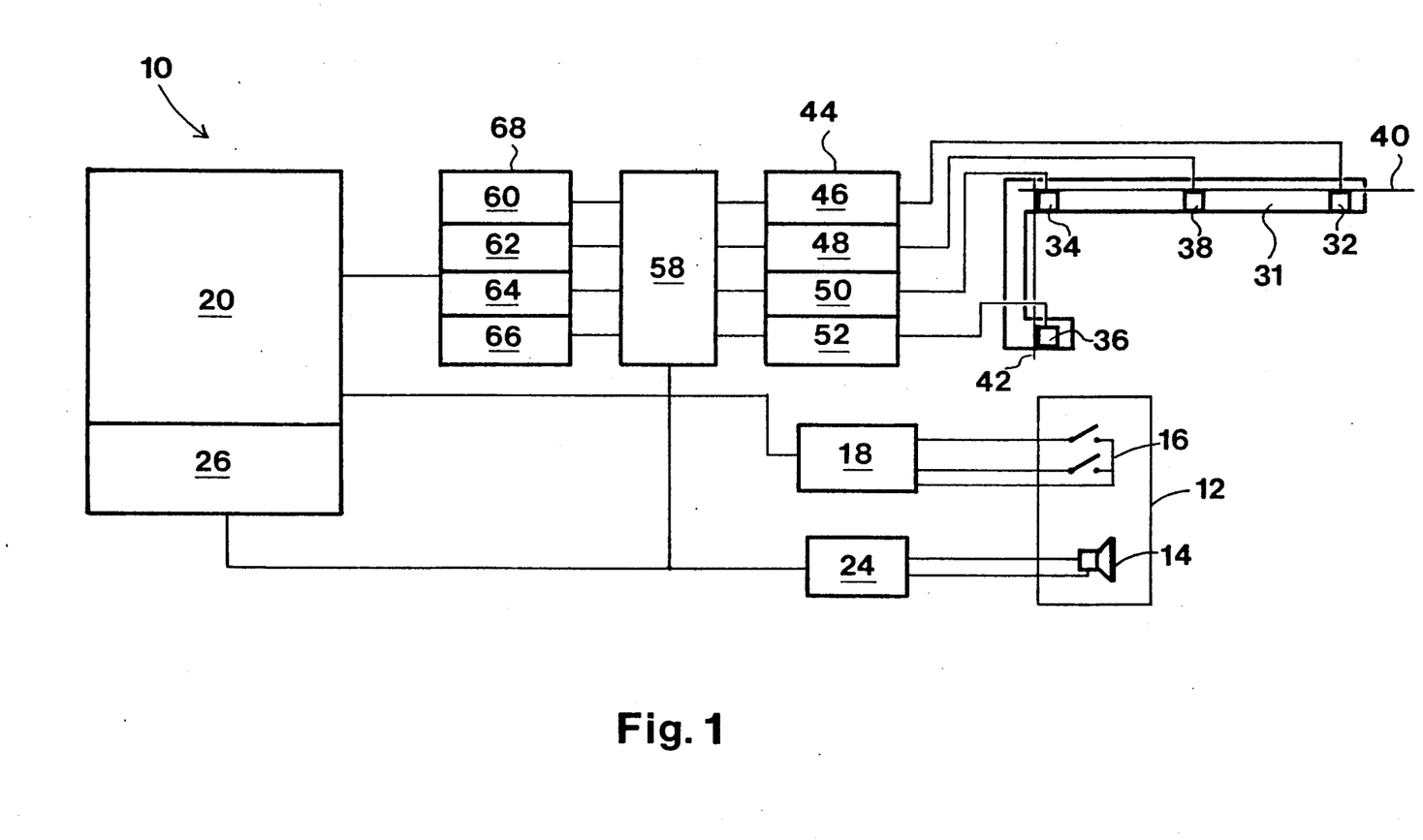
FIG. 1 is a block schematic diagram of the presently preferred embodiment of an ultrasonic position locating device for accomplishing the present inventive method.

The ultrasonic position determining device of the presently preferred embodiment of the present invention is illustrated in a block schematic diagram in FIG. 1 and is designated therein by the general reference character 10. In many of its substantial components, the improved ultrasonic position determining device 10 does not differ significantly from conventional ultrasonic position determining devices. A movable marker 12 having a piezo-electric emitting transducer 14 and two momentary contact switches 16 is that portion of the position determining device 10 which is moved by a user to a position to be determined. The two momentary switches 16 constitute a conventional appurtenance commonly found on computer input devices for providing an additional means of user interaction. The switches 16 are connected to a conventional switch sensing device 18 which, in turn, provides a signal to a computer/calculator 20 when one or both of the switches 16 are depressed. The switches 16 and the switch sensing device 18 are not unique to the present invention and they have no direct relevance to the present inventive method. Further, the selection of the quantity of switches 16 to be included is somewhat arbitrary, and the inventive method could be practiced with any number of switches 16 or with no comparable switches.

The emitting transducer 14 emits an ultrasonic wave burst 22 (FIG. 2) when triggered by a pulse sender 24. The pulse sender is itself triggered by a clocking device 26 which uses conventional means to provide signals to the pulse sender 24 to cause the emitting transducer 14 to emit a wave burst 22 (FIG. 2) of the desired characteristics.

Now beginning a discussion of the relevant characteristics of the emitting transducer 14 and the wave burst 22 and related matters, the emitting transducer 14 is chosen to be of a piezo-electric type because such devices have an inherent Q factor which prevents them from instantly attaining maximum signal amplitude. Thus, when signal is applied to the piezo-electric transducer 14, signal amplitude naturally increases over several cycles, as is depicted in the representation of the wave burst 22 of FIG. 2. This characteristic is desirable in the application because the gradual rise in amplitude prevents an acoustic shock wave from being formed in front of each wave burst which would result in the creation of an audible signal component at the frequency of repetition of the wave bursts 22. Furthermore, unlike methods which must employ an acoustic shock wave as a reference point, the present inventive method makes use of the natural gradual increase in signal amplitude provided by a piezo-electric device to aid in more precisely identifying a reference point within the wave burst 22, as will be discussed hereinafter.

Referring now again to FIG. 2, it can be seen that the wave burst 22 is a short series of individual cycles 28. In the presently preferred embodiment of the present invention, the frequency of repetition of the cycles 28 within a wave burst 22 is 22.5 KHz. The pulse sender 24 is caused to send at this frequency because it is just outside of the normal range of human hearing. Obviously, the lower the frequency, the easier it will be to select and analyze an individual cycle 28, but a lower frequency would produce an undesirable audible sound. The frequency of 22.5 KHz is chosen for use in the presently preferred embodiment 10 of the present invention because a clock frequency of 90 KHz is available within the device, which can easily be reduced to 90/4=22.5 KHz. Other ultrasonic or even sonic frequencies could be employed to practice the invention.

Figure 3:
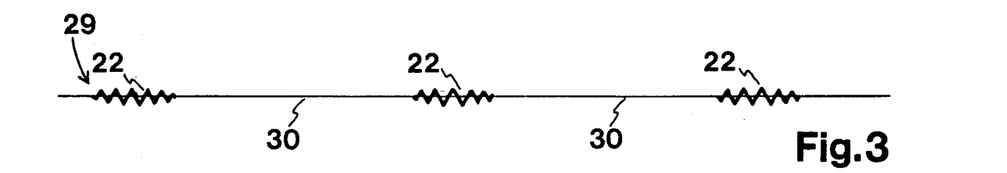
FIG. 3 is a wave form diagram showing the separation in time of bursts of ultrasonic waves, according to the present invention.

Now referring to FIG. 3, wherein is shown a representation of a wave burst series 29 having a sequence of wave bursts 22 with an absence of signal therebetween, it can be seen that each of the bursts 22 is separated by a dead air period 30 during which no ultrasonic wave cycles 28 are being produced. In the presently preferred embodiment of the present invention, the wave bursts 22 are generated at a repetition rate of 100 Hz. Several considerations are involved in the selection of this rate. The repetition rate must obviously not be so slow that subtle movements of the marker are lost between repetitions. However, the rate should also be selected to sufficiently separate the wave bursts 22 in time such that echoes and reflections of a previous burst 22 will be dissipated prior to emanation of its next following burst 22, or else interference and false readings will occur.

In accordance with the consideration just previously discussed, it follows that each wave burst 22 must not be overly long in duration. This means that, while it is desirable that the piezo-electric emitting transducer 14 (FIG. 1) have a Q factor sufficiently large to cause the wave burst 22 to ramp up in magnitude over several cycles 28, the Q factor of the transducer 14 should also not be so large that it takes more than just a few cycles 28 for the wave burst 22 to ramp up or to ramp down. Therefore, the inventor has chosen, for the presently preferred embodiment of the invention, to use a transducer with a wider frequency bandwidth and smaller Q factor than many commercially available transducers. The emitting transducer 14 is designed for Operation in the 18 KHz to 24 KHz range. The particular transducer used is commercially available from muRata Manufacturing Company, Ltd., 2200 Lake Park Drive, Smyrna, Ga., under the part number MA23L3. This type device is particularly suitable for the application also because, as will be discussed hereinafter, it is desirable that, for purposes of practicing the present invention, there be some significant difference in magnitude between at least some successive cycles 28 within the pulse 22. Of course, the longer it takes the transducer 14 to ramp up to its maximum output, the less probable it will be that there will be a recognizable difference in magnitude between successive cycles 28. Therefore, this component choice represents a compromise between the necessity that the transducer 14 should not reach its peak Output magnitude immediately upon being stimulated, but neither should it take too long to reach its peak output magnitude.

Referring again to FIG. 1, a stationary reference frame 31 having a first receiving transducer 32, a second receiving transducer 34, a third receiving transducer 36 and a fourth receiving transducer 38 is provided. In the presently preferred embodiment 10 of the invention, the receiving transducers 32, 34, 36 and 38 are electret microphone elements, which have a low Q factor, and thus respond in a relatively linear fashion to any signal received, within the relevant frequency range. Also, in the presently preferred embodiment 10 of the invention, the stationary receiving frame is intended to be placed on a table or other work surface (not shown), although this is not critical to the invention. The first, second and fourth receiving transducers 32, 38 and 34 lie on a first straight line 40, and are placed 9.00 inches (22.86 cm) from each other on the receiving frame 27, while the third receiving transducer 36 is placed on a second straight line 42 drawn through the second receiving transducer 34 and perpendicular to the first straight line 40. The third receiving transducer 36 is positioned 6.00 inches (15.24 cm) from the second receiving transducer 34. It will be clear to one skilled in the art that these geometries and dimensions can be varied but that they must be known, as necessary trigonometric calculations must include these known relationships in determining the (unknown) position of the marker 12, as will be discussed hereinafter.

After each wave burst 22 is emitted from the transducer 14, it is propagated through the air and is received at each of the receiving transducers 32, 34, 36 and 38. Because of propagation delay of the ultrasonic signal through air, the time at which the wave burst 22 is received at each of the receiving transducers 32, 34, 36 and 38 will vary as an inverse function of the distance of the marker 12 from each respective receiving transducer 32, 34, 36 and 38.

Signal received at each of the receiving transducers 32, 34, 36 and 38 is provided to an analog signal processing unit 44 which has a first analog signal processing section 46, a second analog signal processing section 48, a third analog signal processing section 50 and a fourth analog signal processing section 52 for processing output from the receiving transducers 32, 34, 36 and 38. The analog signal processing unit 44 identifies a second cycle 54 (FIG. 2) in the ultrasonic wave burst 22, and then identifies a zero crossing point 56 immediately following the second pulse 54.

During operation of the position locating device 10, a signal from the clocking device 26 is sent at 1/100 second intervals, as described above, to the pulse sender 24 and is also sent to a pulse detector 58. This signal triggers the pulse sender to excite the emitting transducer 14 in the movable marker 12 so as to emit an ultrasonic wave burst 22, and also triggers the pulse detector 58 to simultaneously start a first distance timer clock 60, a second distance timer clock 62, a third distance timer clock 64 and a fourth distance timer clock 66 located in a distance timer unit 68. When the zero crossing point 56 immediately following the second cycle 54 is encountered within each of the analog signal processing sections 46, 48, 50 and 52, a signal is sent to the pulse detector 58 which stops the corresponding distance timer clock 60, 62, 64 or 66. Thereafter, the computer/calculator 20 utilizes times recorded by each of the distance timer clocks 60, 62, 64 and 66 to calculate the distance of each of the receiving transducers 32, 34, 36 and 38 from the movable marker 12. The position of the movable marker 12 relative to the receiving transducers 32, 34, 36 and 38 is then calculated using ordinary trigonometric calculations according to methods utilized in prior art ultrasonic position locating methods. In the presently preferred embodiment 10 of the invention, the computer/calculator 20 is itself the computer into which it is desired to input positional data using the inventive device. This is in accordance with conventional prior art methods and hardware arrangements. Alternatively, one skilled in the art will appreciate that a separate computer/calculator (not shown) could be adapted to perform the functions described herein in order to free a primary computer (not shown) for other tasks. In the presently preferred embodiment 10 of the invention, the distance timer clocks 60, 62, 64 and 66 operate at a frequency of 6 MHz.

One skilled in the art will notice that emission of a wave burst 22 from the movable marker 12 may not correspond exactly in time to the signal produced by the clocking device 26 which causes the distance timer clocks 60, 62, 64 and 66 to start. Further, a portion of the times recorded by the clocks 60, 62, 64 and 66 is attributable to the time between inception of an emission of a wave burst 22 and emission of the zero crossing point 56 following the second cycle 54 of the wave burst 22. However, since these factors remain constant over time (for all practical purposes) they are easily accounted for in the calculations.

In applications wherein relative movement of the marker is all that is required, such as those mouse type applications wherein the only objective is to allow an operator to control movements of a cursor on a computer screen, corrections of the calculations to compensate for variances in the extant speed of sound might not be required. However, the present invention also does provide a means for accurately figuring variations in speed of propagation of the wave bursts 22 through ambient air, as is required in those applications requiring greater precision. As was previously explained, in the presently preferred embodiment 10 of the invention, the first, second and fourth receiving transducers 32, 38 and 34 lie on a first straight line 40, and are placed 9.00 inches (22.86 cm) from each other on the receiving frame 31. As can be readily appreciated, it is a matter of simple arithmetic to calculate the extant speed of sound using the known distances along the straight line 34 and known transit times between the emitting transducer 14 and the first, second and fourth receiving transducers 32, 38 and 34. This adjustment to the distance calculations insures that the high degree of precision obtainable by use of the present invention is not lost by using an imprecise estimate of the extant speed of sound in calculating distance.

Now beginning a discussion of the method and apparatus for determining a precise reference point on the wave burst 22, within the analog signal processing unit 44; as discussed above, output from the receiving transducers 32, 34, 36 and 38 is provided to the analog signal processing unit 44 which has therein the first analog signal processing section 46, the second analog signal processing section 48, the third analog signal processing section 50 and the fourth analog signal processing section 52 for processing output from respective receiving transducers 32, 34, 36 and 38. The analog signal processing section 46 is depicted in the schematic diagram of FIG. 4. Each of the analog signal processing sections 46, 48, 50 and 52 is identical to the others. Therefore, FIG. 4 serves to illustrate the design and function of any of the analog signal processing sections.

Figure 4:
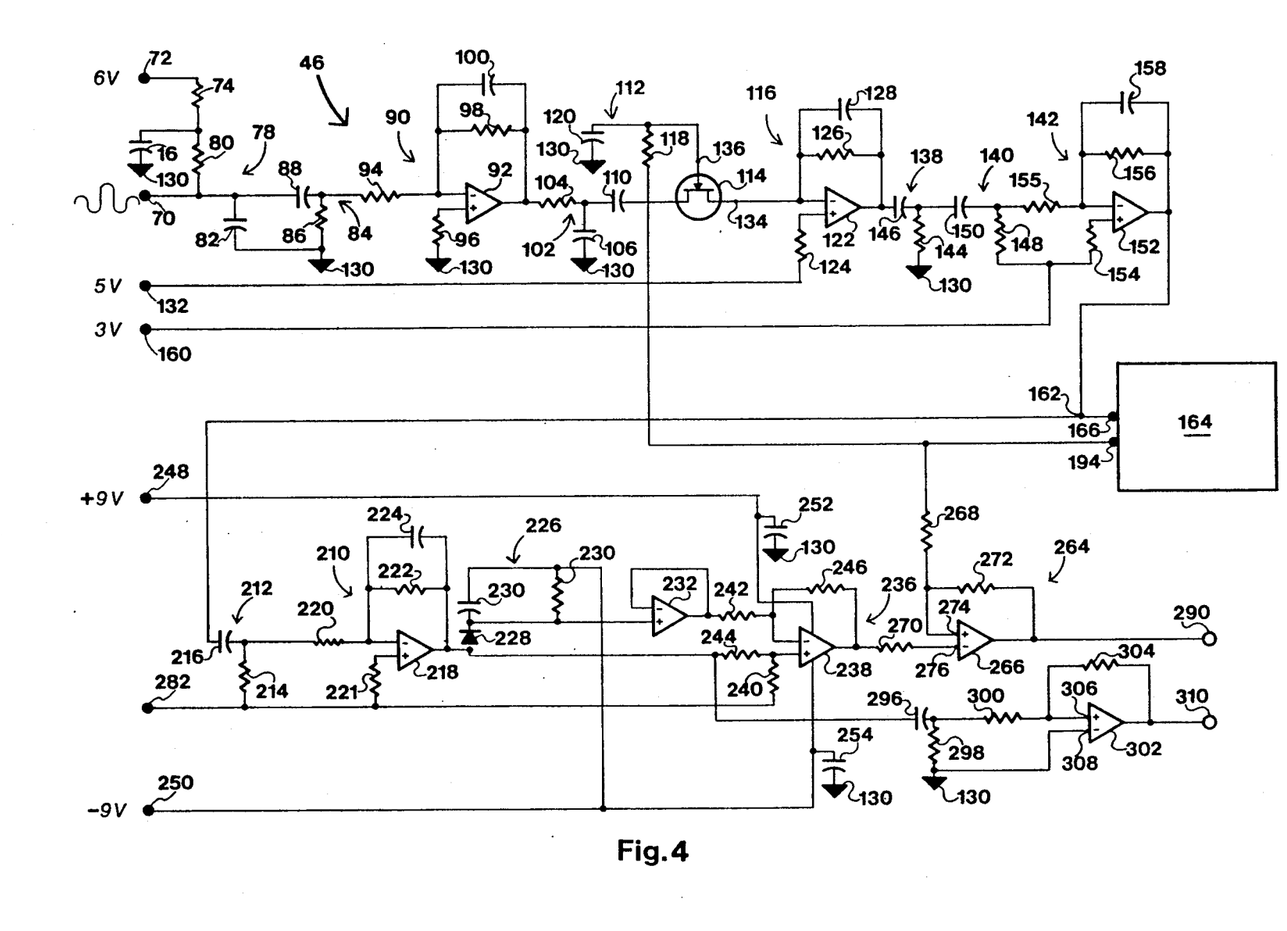
FIG. 4 is a schematic diagram of an analog signal processing section according to the present invention.

Signal enters the analog signal processing section 46 from the first receiving transducer 32 (FIG. 1) at a signal input node 70. Power for the first receiving transducer 32 (FIG. 1) is provided at a microphone power input node 72 through a microphone power isolation resistor 74. A power isolation capacitor 76 is provided to bypass to ground any transient or alternating current content in supplied power. Signal is then cleaned by a first low pass filter 78 having a first low pass filter resistor 80 and a first low pass filter capacitor 82, and by a first high pass filter 84 having a first high pass filter resistor 86 and a first high pass filter capacitor 88, all connected as shown in FIG. 4. Signal then proceeds to a first fixed gain amplifier 90 having a first JFET operation amplifier (op. amp.) 92, a first amplifier input resistor 94, a first amplifier biasing resistor 96, a first amplifier feedback resistor 98 and a first amplifier high frequency limiting feedback capacitor 100. Connection and selection of component parts of the first fixed gain amplifier 90 are all in accordance with ordinary operational amplifier biasing procedures, as illustrated in FIG. 4. Signal from the first fixed gain amplifier 90 is then further cleaned by a second low pass filter 102 having a second low pass filter resistor 104 and a second low pass filter capacitor 106.

Signal is next processed through an automatic gain control (AGC) unit 108 having an input coupling capacitor 110, an AGC low pass filter 112, a voltage controlled resistor (VCR) 114 and a second amplifier 116. The AGC low pass filter has an AGC low pass filter resistor 118 and an AGC low pass filter capacitor 120. The second amplifier 116 has a second JFET op. amp. 122, a second amplifier biasing resistor 124, a second amplifier feedback resistor 126 and a second amplifier high frequency limiting feedback capacitor 128. As can be seen in the schematic of FIG. 4, while the first fixed gain amplifier 90 is biased to a ground reference 130, the second amplifier is biased from an AGC bias offset voltage input node 132. One skilled in the art will observe that a DC voltage introduced at the AGC bias offset voltage input node 132 will also be present at a VCR source node 134. This accounts for the inclusion of the input coupling capacitor 110, since there is a shift in DC level at this point of the circuit. For reasons which will be explained hereinafter, the DC voltage present at a VCR gate node 136 is approximately $+3$ VDC. Thus, operational range on the characteristic curve of the voltage controlled resistor 114 is set by the voltage present at the AGC bias offset voltage input node 132 (voltage at the VCR gate node 136 being fixed by other considerations to be discussed hereinafter). The inventor has found that the voltages given herein provide an optimal operational range for the VCR4N type voltage controlled resistor 114 used in the best presently known embodiment 10 of the present invention.

Inclusion of the AGC low pass filter 112 improves the functioning of the AGC unit 108 by tapping off any stray high frequency noise at the VCR gate node 136 so that such noise will not be amplified by the operation of the voltage controlled resistor 114.

It should be noted that the AGC unit 108 functions to reduce the amplitude of more powerful signals in proportion relative to amplitude of such signals as received at the first receiving transducer 32 (FIG. 1). This function is made desirable because of the fact that amplitude of an ultrasonic wave burst 22 (FIG. 2) at the first receiving transducer 32 falls off with the square of the distance of the receiving transducer 32 from the emitting transducer 14 (FIG. 1). Thus, signal received at the receiving transducer 32 would be very large when the movable marker 12 is brought near the first receiving transducer 32, and would overdrive circuitry of the first analog signal processing section 46, were the AGC unit 108 not included. However, it should also be noted that the AGC unit 108 by no means completely equalizes the magnitude of all signals, and the inventive method is not at all dependent upon the completeness of such magnitude compression as might be expected given some prior art approaches to the problem.

After signal amplitude range is compressed by the AGC unit 108, it is further processed by a second high pass filter 138, a third high pass filter 140 and a third amplifier 142. The second high pass filter 138 has a second high pass filter resistor 144 and a second high pass filter capacitor 146, and the third high pass filter 140 has a third high pass filter resistor 148 and a third high pass filter capacitor 150, as shown in FIG. 4. The third amplifier 142 has a third JFET op. amp. 152, a third amplifier biasing resistor 154, a third amplifier input resistor 155, a third amplifier feedback resistor 156 and a third amplifier high frequency limiting feedback capacitor 158. The third amplifier 142 is DC biased by a voltage applied at a peak offset voltage biasing node 160, which voltage is +3VDC in the best presently known embodiment 10 of the invention.

As described above, it can be seen that signal appearing at a first branching node 162 is a filtered and gain controlled version of signal appearing at the signal input node 70. It should be noted that there are numerous methods known in the art for accomplishing this portion of the signal processing within the first analog signal processing section 46. The inventor's choice of using three amplification stages was predicated upon the relative signal levels present and the gain available from the first, second and third JFET op. amps. 92, 122, and 152. The first, second and third (JFET op. amps. 92, 122, and 152 are, in the best presently known embodiment 10 of the invention contained within a quad integrated circuit package type TL074, which was chosen because of its high input impedance and low noise characteristics.

As described herein the low pass filters 78 and 102, and the high pass filters 84, 138 and 140 are simple R/C type filters. Of course, more sophisticated active filters could be used to more completely clean the signal, but these would introduce a Q factor which would alter the ramp up rate of the ultrasonic wave burst 22 signal (FIG. 2) which, as may be appreciated, would be less than desirable given the inventive principles. Also, it should be noted that the low pass filters 78 and 102, and the high pass filters 84, 138 and 140 could be bunched together, rather than being distributed as shown in FIG. 4 and as described herein. The advantage of the arrangement used in the best presently preferred embodiment 10 lies in that signal loss occurring within filters can be compensated in steps at the various amplifier stages.

Figure 5:
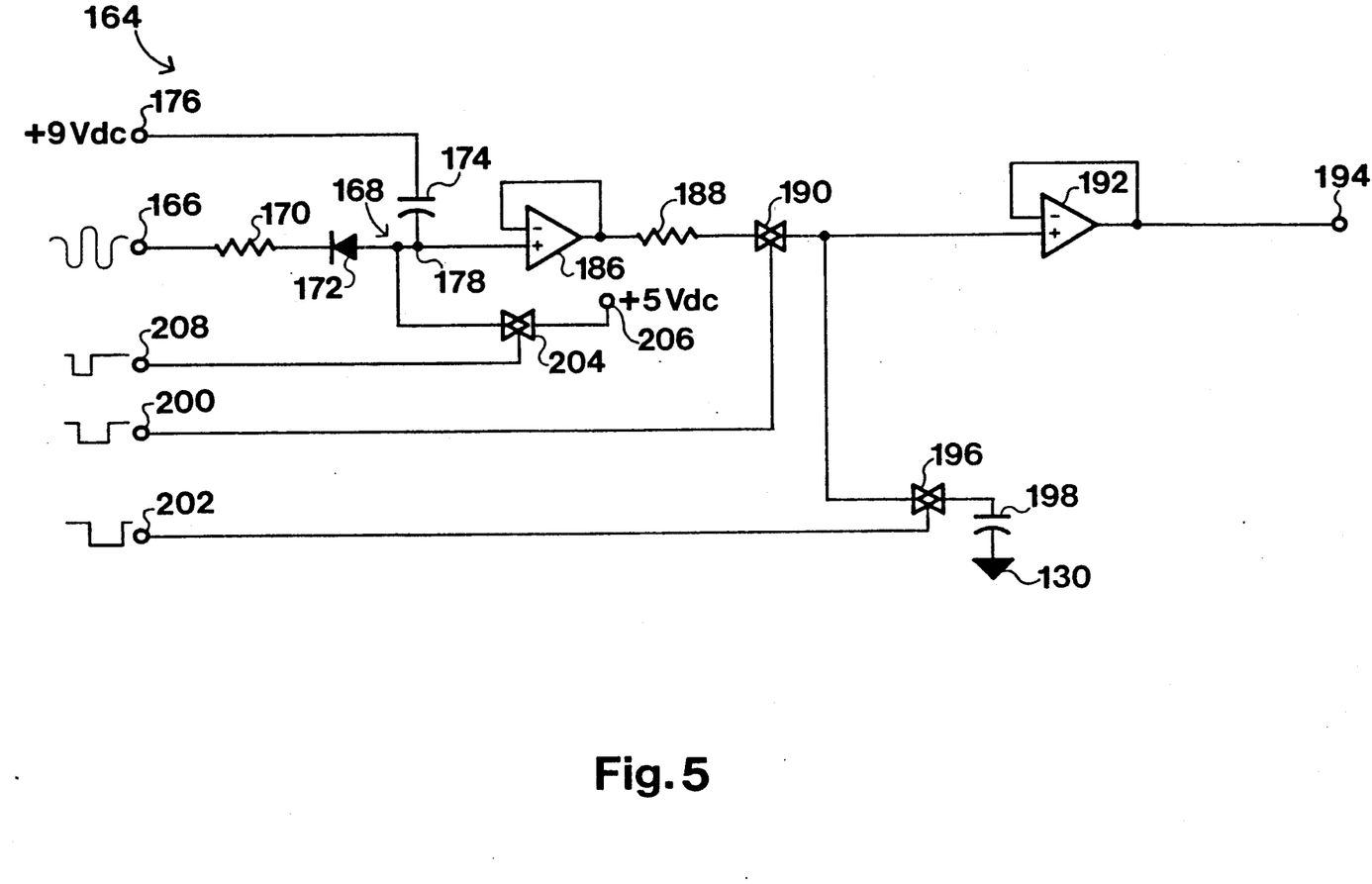
FIG. 5 is a schematic diagram of an analog sample and store section according to the present invention.

From the first branching node 162 signal is supplied to an analog sample and store unit (sample and hold) 164. Referring now to FIG. 5, wherein is shown a detailed schematic diagram of the sample and hold 164, signal is applied to a sample and hold input node 166 and fed to a peak detector circuit 168 through a current limiting resistor 170. The peak detector circuit 168 has a peak detector diode 172 and a peak storage capacitor 174 configured as shown in FIG. 5. In the presently preferred embodiment 10 of the invention, the peak storage capacitor 174 is biased with +9VDC applied at a peak detector biasing node 176.

Figure 6:
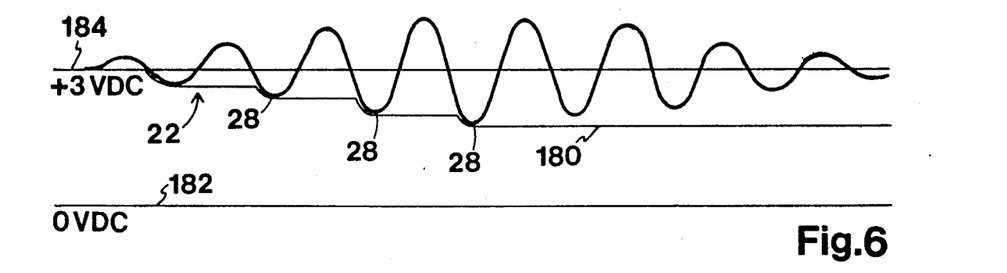
FIG. 6 is a wave form representation of a peak follower output signal as produced within the best presently known embodiment of the present invention.

As will be appreciated by one skilled in the art, a peak detector output node 178 will retain an instantaneous DC voltage level equal to the most negative voltage encountered in a just previously processed ultrasonic wave burst 22 (FIG. 2), which voltage will be the sum of the most negative excursion of any individual cycle 28 within that wave burst 22 plus the +3VDC supplied at the peak offset voltage biasing node 160 A peak output signal 180 representative of signal that might be present at the peak detector output node 178 is illustrated in FIG. 6 superimposed upon the individual cycles 28 of the ultrasonic wave burst 22. Although, of course, FIG. 6 is not drawn to scale (nor are any of the other figures herein), a zero voltage reference 182 and a +3VDC bias reference 184 are shown to illustrate the voltage summation described herein.

Referring again to FIG. 5, the peak output signal 180 (FIG. 6) present at the peak detector output node 178 is coupled through a first high impedance unity gain buffer amplifier (first buffer amplifier) 186, a damping resistor a sample switch 190, and a second buffer amplifier 192 to a sample and hold output node 194. As shown in FIG. 5, a first select switch 196 controls signal path to a hold capacitor 198.

When a timing pulse is applied to a sample pulse node 200 while another timing pulse is simultaneously applied to a first select switch timing node 202, the hold capacitor 198 is allowed to charge to the level of the peak storage capacitor 174.

A dump switch 204 provides a path to dump any charge present on the peak storage capacitor 174 through a dump level node 206 when timing signal is applied to a dump timing node 208.

The timing of events within the sample and hold 164 during normal operation of the best presently known embodiment 10 of the invention is as follows: After each ultrasonic wave burst 22 (FIG. 2) is processed by the first analog signal processing section 46, the output coupling switch 190 and the first select switch 196 are closed by applying timing pulse to both the sample pulse node 200 and the first select switch timing node 202, which allows the hold capacitor 198 to Charge to the level of the peak storage capacitor 174. In other terms, the hold capacitor 198 obtains the charge level of the highest peak level of that ultrasonic wave burst 22 which has just been processed. Then, the output coupling switch 190 is opened and the dump switch 204 is closed, allowing charge on the peak storage capacitor 174 to dump through the dump level node 206 while the hold capacitor 198 retains its charge. The dump switch 204 is then reopened before the next ultrasonic wave burst 22 is received. This sequence is repeated after each ultrasonic wave burst 22 is processed. One skilled in the art will now appreciate that, during the time period within which any of the ultrasonic wave bursts 22 are being processed, the peak storage capacitor 174 will be employed in the detection and retention of the highest peak within that wave burst 22, while level present at the sample and hold output node will be that of highest peak of the last previously processed wave burst 22 (including any DC peak offset voltage, as previously disclosed).

Timing signals to the sample pulse node 200, the first select switch timing node 202 and the dump timing node 208 are, of course, supplied by the computer/calculator 20 (FIG. 1). Provision of such timing signals is entirely in accordance with prior art methods and apparatus for providing timing signals. It should also be noted that the sample and hold unit 164, as described herein, is not necessary to the practice of the present invention. In fact, the inventor has successfully practiced the invention using a simple R/C sample and hold (not shown) with a timing constant sufficiently long to hold peak values between wave bursts 22 but yet short enough to dip sufficiently to accommodate situations wherein successive wave burst 22 magnitudes are decreasing in value. However, as will be discussed hereinafter, a more sophisticated sample and hold such as the sample and hold unit 164 described herein as being utilized within the best presently known embodiment 10 of the present invention is required in some applications of the invention.

It should be clear to one skilled in the art that, given the operation of the sample and hold unit 164 described herein, any first wave burst 22 in a sequence of wave bursts 22 will not be useful for measurement purposes, since measurement is dependent upon comparison to a just previous wave burst 22, as will be described hereinafter. The damping resistor 188 is provided to limit the amount by which charge on the hold capacitor 198 may vary between successive wave bursts 22 to prevent undue oscillation of this value. One familiar with the art will recognize that, as with any prior art ultrasonic position locating device, provision must be made in the controlling software to prevent aberrant indications from resulting in false data output. For instance, if the movable marker 12 is moved with extreme rapidity, it is possible that the charge on the hold capacitor 198 might not be indicative of values of an instant ultrasonic wave burst 22. In brief, controlling software should allow only a limited range of change in output data between successive cycles. If calculations would seem to indicate data outside of that range, the computer/calculator 20 (FIG. 1) should not update the output data until successive results within the acceptable range of change indicate that the system has again stabilized.

Referring again to FIG. 4, it can be seen that signal appearing at the first branching node 162 is also provided to a gain setting amplifier 210 through a fourth high pass filter 212. The fourth high pass filter 212 has a fourth high pass filter resistor 214 and a fourth high pass filter capacitor 216. The gain setting amplifier 210 has a gain setting JFET op. amp. 218, a gain setting amplifier input resistor 220, a gain setting amplifier biasing resistor 221, a gain setting amplifier feedback resistor 222 and a gain setting amplifier high frequency limiting feedback capacitor 224.

Figure 7:
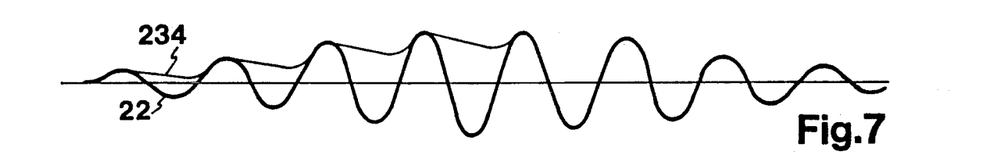
FIG. 7 is a wave form representation of a half wave processed signal as produced within the best presently known embodiment of the present invention.

The gain setting amplifier 210 provides signal to a half wave extraction circuit 226 which has a half wave rectifying diode 228, a half wave storage capacitor 230, a bleed resistor 230 and a third high impedance unity gain buffer amplifier 232. One skilled in the art will observe that the half wave processing circuit 226 will modify an ultrasonic wave burst 22 signal shape to produce a half wave processed signal 234 as illustrated in FIG. 7. The half wave processed signal 234 is shown in FIG. 7 superimposed upon the ultrasonic wave burst 22 signal from which it is derived. The half wave processed signal is then provided to a difference amplifier 236 having a difference JFET op. amp. 238, a difference amplifier biasing resistor 240, a difference amplifier first input resistor 242, a difference amplifier second input resistor 244 and a difference amplifier feedback resistor 246. The difference JFET op. amp. 238 must be supplied with bipolar power which is provided at a first bipolar power input node 248 and a second bipolar power input node 250, as shown in the drawing of FIG. 4. A first bipolar power bypass capacitor 252 and a second bipolar power bypass capacitor 254 are provided to clean power entering at the bipolar power input nodes 248 and 250.

Figure 8:
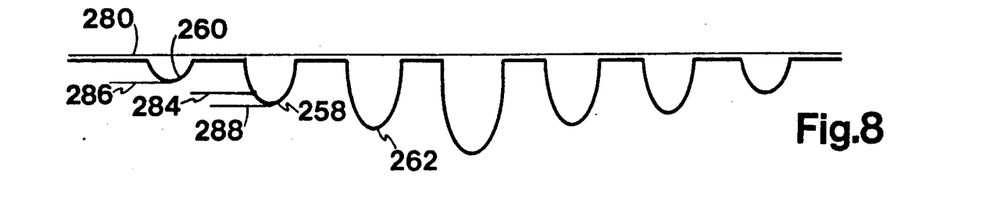
FIG. 8 is a wave form representation of a summed half wave signal as produced within the best presently known embodiment of the present invention.

Now summarizing the combined effects of the half wave extraction circuit 226 and the difference amplifier 236; power from positive going portions of each individual cycle 28 (FIG. 2) is saved and combined with negative going portions of each next following individual cycle 28. While the present invention can be practiced without the half wave extracting circuit 226 and the difference amplifier 236, the inventor has found that inclusion of these subcircuits greatly enhances the reliability of the invention. This is because, as will be described hereinafter, one of the purposes of the first analog signal processing section 46 is to distinguish and identify a second cycle 258 (FIG. 8). Clearly, the signal processing which occurs within the combined half wave extraction circuit 226 and the difference amplifier 236 causes any difference which exists between individual cycles 28 (FIG. 2) to be increased to provide a substantial difference in peak magnitude between the second cycle 258 and either a first cycle 260 or a third cycle 262, as is illustrated in FIG. 8.

Referring again to FIG. 4, a cycle two detector 264 provides a means for identifying the second cycle 258 (FIG. 8). The cycle two detector has a cycle two comparator 260, a cycle two first input resistor 262, a cycle two second input resistor 264 and a cycle two feedback resistor 268. As can be seen in the schematic diagram of FIG. 4, the voltage level appearing at a cycle two comparator positive input is obtained from the sample and hold output node 194 which level, as has been discussed previously herein, is the summation of the highest peak level obtained from a just previous ultrasonic wave burst 22 (FIG. 2) and the +3VDC introduced at the peak offset voltage biasing node 160 Signal appearing at a cycle two comparator negative input 276 is the summed half wave signal 256 (FIG. 8). Selection of the second cycle 258 is accomplished by providing a voltage at a pulse detect offset input node 282 which will cause the cycle two comparator 266 to trigger at a cycle two comparator trigger level 284 which is half way between a cycle one peak level 286 and a cycle two peak level 288. Put in other terms, the cycle two comparator trigger level 284 is the peak output signal 180 (FIG. 6) from the just previous wave burst 22. Of course, the cycle two comparator trigger level 284 could be set to be any value between the cycle one peak level 286 and the cycle two peak level 288 but, of course, setting it as described herein provides the maximum latitude for error. In the presently preferred embodiment 10 of the present invention, given the value and function of components as described herein, the inventor has found that the proper voltage to be applied at the pulse detect offset input node is +3VDC As described herein, output is provided at a second cycle detect output node 290 When the second cycle 2$8 (FIG. 8) has been encountered. It should be noted that the inventor has found that the characteristics of components used in the manufacture of the best presently known embodiment 10 of the invention are sufficiently consistent that no individual calibration or adjustment is required when producing an analog signal processing unit 44 (FIG. 1), the component values and voltage level setting described herein enabling implementation of the invention without such calibration or adjustment.

Figure 2:
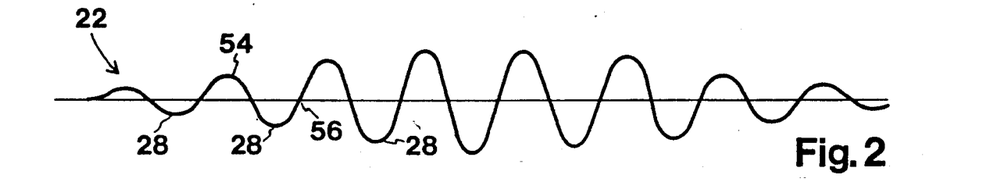
FIG. 2 is a wave form diagram representing a single ultrasonic burst as produced using the present invention.

In accordance with the principles of operation of the present inventive method, as described herein, an individual cycle 28 of an ultrasonic wave burst 22 {the second cycle 258 (FIG. 8)} having been detected, an exact point on that individual cycle 28 should now be identified. In the best presently known embodiment 10 of the present invention, the zero crossing point 56 (FIG. 2) immediately following detection of the second cycle 258 is used as that reference point. Referring again to FIG. 4, a zero crossing detector 294 is provided for the purpose. The zero crossing detector 294 has a zero crossing high pass input capacitor 296, a zero crossing high pass input resistor 298, a zero crossing input resistor 300, a zero crossing comparator 302 and a zero crossing comparator feedback/hysteresis resistor 304 As can be seen in the schematic diagram of FIG. 4, the zero crossing high pass input capacitor 296 eliminates any DC component from signal arriving at a zero crossing comparator positive input 306. Furthermore, a zero crossing comparator negative input 308 is set to ground 130. Therefore a signal will be provided at a zero crossing detect output node 310 when an individual cycle 28 (FIG. 2) crosses ground level from negative to positive, as at the zero crossing point 56 (FIG. 2).

Of course, signals appearing at the second cycle detect output node 290 and the zero crossing detect output node 310 are conditioned by conventional means to provide TTL level inputs for the pulse detector 58 (FIG. 1). As explained previously herein, when signal from the second cycle detect output node 290 is followed by signal from the zero crossing detect output node 310, the pulse detector 58 causes the appropriate distance timer clock 60, 62, 64 or 66 within the distance timer unit 68 to stop. Since the distance timer clocks 60, 62, 64 and 66 were simultaneously started upon emission of the ultrasonic wave burst 22 from the piezoelectric emitting transducer 14, the time at which each distance timer clock 60, 62, 64 and 66 is stopped is a reliable indication of the distance of respective receiving transducers 32, 34, 36 and 38 from the movable marker 12. Calculations to determine the position of the movable marker 12 then are performed by the computer/calculator according to prior art methods for determining the position of a marker based upon distance from that marker to fixed reference points. Also, as previously described herein, the best presently known embodiment 10 of the invention provides sufficient reference points to determine position in three dimensions and to correct for variances in extant speed of sound.

As described herein, the first analog signal processing section 46 (which is identical to the analog signal processing sections 48, 50 and 52) is dependent in operation upon the setting of certain signal levels within the circuit. Although it is believed that one skilled in the art should be able to attain the desired results given the description of such signal levels as heretofore described along with the discussion of relevant theory which has been provided, in order to ensure enablement of the unique hardware utilized to implement the inventive method in the best presently known embodiment 10, the following TABLE A is provided which lists values and types of the components of the first analog signal processing section.

TABLE A 74 microphone power isolation resistor: 100Ω
76 power isolation capacitor: 1μF
80 first low pass filter resistor: 2.2KΩ
82 first low pass filter capacitor: 1000pF
86 first high pass filter resistor: 10KΩ
88 first high pass filter capacitor: 1000pF
92 first JFET: TL074
first amplifier input resistor: 10KΩ 96 first amplifier biasing resistor: 10KΩ
98 first amplifier feedback resistor: 220KΩ
100 first amp hi frequency limiting cap.: 33pF
104 second low pass filter resistor: 1KΩ
106 second low pass filter capacitor: 1000pF
110 AGC input coupling capacitor: 0.1F
114 voltage controlled resistor: VCR4N
118 AGC low pass filter resistor: 100KΩ
120 AGC low pass filter capacitor: 1000pF
122 second amplifier JFET: TL074
124 second amplifier biasing resistor: 10KΩ
128 second amp hi freq. limiting feedback cap: 150pF
144 second high pass filter resistor: 10KΩ
146 second high pass filter capacitor: 1000pF
148 third high pass filter resistor: 10KΩ
150 third high pass filter capacitor: 1000pF
152 third amplifier JFET: TL074
154 third amplifier biasing resistor: 10KΩ
155 third amplifier input resistor: 26.7KΩ
156 third amplifier feedback resistor: 1MΩ
157 third amp hi freq. limiting feedback cap.: 5pF
170 current limiting resistor: 1KΩ
172 peak detector diode: 1N3595
174 peak storage capacitor: 0.01μF
186 first unity gain buffer amplifier: TL074
188 damping resistor: 1KΩ
190 output coupling switch: 74HC4066
192 second unity gain buffer amplifier: TL074
196 first select switch: 74HC4066
198 hold capacitor: 0.1μF
204 dump switch: 74HC4066
214 fourth high pass filter resistor: 10KΩ
216 fourth high pass filter capacitor: 1000pF
218 gain setting amplifier JFET: TL074
220 gain setting amplifier input resistor: 63.4KΩ
221 gain setting amplifier biasing resistor: 10KΩ
222 gain setting amplifier feedback resistor: 100KΩ
224 gain setting amp hi freq. limiting capacitor: 68pF
228 half wave rectifying diode: 1N3595
230 bleed resistor: 1MΩ
232 third unity gain buffer amplifier: TL074
238 difference amplifier JFET: TL074
240 difference amplifier biasing resistor: 10KΩ
242 difference amplifier first input resistor: 10KΩ
244 difference amplifier second input resistor: 10KΩ
246 difference amplifier feedback resistor: 10KΩ
252 first bipolar bypass capacitor: 0.1μF
254 second bipolar bypass capacitor: 0.1μF
266 cycle two comparator: LM339
268 cycle two first input resistor: 10KΩ
270 cycle two second input resistor: 10KΩ
272 cycle two feedback resistor: 1MΩ
296 zero crossing high pass input capacitor: 0.1μF
298 zero crossing high pass input resistor: 1KΩ
300 zero crossing input resistor: 10KΩ
302 zero crossing comparator: LM0339
304 zero crossing comparator feedback resistor: 1MΩ

Figure 9:
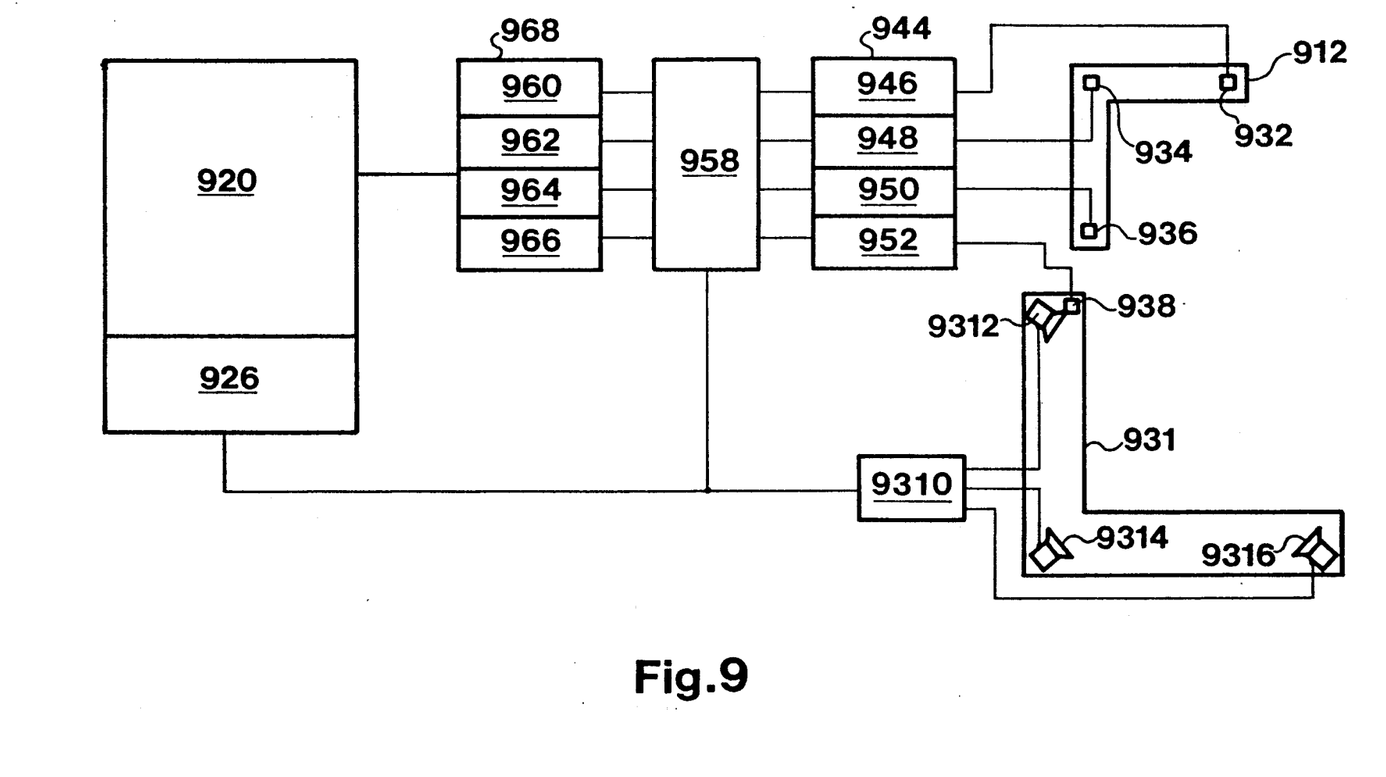
FIG. 9 is a block schematic diagram of an equally preferred alternate embodiment of an ultrasonic position locating device according the present invention.

As described herein, the best presently preferred embodiment 10 of the invention has an analog signal processing unit 44 having four analog signal processing sections 46, 48, 50 and 52 for effectuating the inventive method of identifying a specific point on a ultrasonic wave burst 22 and thus for providing a means to implement the inventive method for calculating distance. FIG. 9 depicts an alternate equally preferred embodiment of the invention in which is designated therein by the general reference character 910. The alternate preferred embodiment 910 of the invention utilizes the same inventive method for measuring distance as does the first preferred embodiment 10. How ever, the alternate preferred embodiment 910 makes use of the high resolution available through application of the inventive method to provide positional and attitudinal data relating to six degrees of freedom. The additional features found in the alternate preferred embodiment 910, do require attention to some considerations not addressed in the above discussion relating to the first preferred embodiment 10 of the invention.

The alternate preferred embodiment 910 accomplishes the same inventive method as does the first preferred embodiment 10 of the invention and is similar in construction thereto. The alternate preferred embodiment 910, like the first preferred embodiment 10, has a movable marker 912, computer/calculator 920, a clocking device 926 and a stationary reference frame 931. The alternate embodiment 910 of the invention differs from the first preferred embodiment 10 in that a first receiving transducer 932, a second receiving transducer 934 and a third receiving transducer 936 are located in the movable marker 912. A fourth receiving transducer 938 is located within the stationary reference frame 931.

The alternate embodiment 910 also has an analog signal processing unit 944 which has therein a first analog signal processing section 946, a second analog signal processing section 948, a third analog signal processing section 950 and a fourth analog signal processing section 952. Also, like the first preferred embodiment 10, the alternate preferred embodiment has a pulse detector 958, a first distance timer clock 960, a second distance timer clock 962, a third distance timer clock 964, and a fourth distance timer clock 966. The distance timer clocks 960, 962, 964 and 966 are components of a distance timer unit 968.

In the alternate preferred embodiment 910 of the invention, a pulse distribution unit 9310 is provided which is similar in function to the pulse sender 24 of the first preferred embodiment 10 except that the pulse distribution unit 9310 sends signal sequentially to a first emitting transducer 9312, a second emitting transducer 9314 and a third emitting transducer 9316.

In the alternate embodiment 910 of the invention the first, second and third receiving transducers 932, 934 and 936 are positioned at the corners of a right triangle, as is show in FIG. 9, with the first receiving transducer 932 being 2.00 inches (5.08 cm.) from the second receiving transducer 934, and the third receiving transducer 936 being 2.00 inches (5.08 cm.) from the second receiving transducer 934. The emitting transducers 9312, 9314 and 9316 also are positioned to form a right triangle with the first emitting transducer 9312 being 6.00 inches (15.24 cm.) from the second emitting transducer 9314 and with the third emitting transducer 9316 being 9.00 inches (22.86 cm.) from the second emitting transducer 9314. In the operation of the alternative embodiment 910 of the invention, distance measurement between each of the first, second and third receiving transducers 932, 934 and 936 and each of the emitting transducers 9310, 9312 and 9316 is accomplished. Then, by using the same known calculation technique used in the first preferred embodiment 10 and in the prior art to calculate position in three dimensions once distances from three reference points is known, the position of each of the first, second and third receiving transducers 932, 934 and 936 relative to each of the emitting transducers 9312, 9314 and 9316 is found. This, of course, provides information not only about the relative position of the movable marker 912, but also about the attitude of the movable marker 912 in terms of roll, pitch, and yaw.

Specifically, in order to determine the distance measurement between each of the first, second and third receiving transducers 932, 934 and 936 and each of the emitting transducers 9312, 9314 and 9316, the emitting transducers 9312, 9314 and 9316 are caused to sequentially emit ultrasonic wave bursts 22 (FIG. 2). First, the first emitting transducer 9312 emits a wave burst 22 and the distance from the first emitting transducer 9312 to each of the first, second, and third receiving transducers 932, 934 and 936 is determined in the same manner described herein in conjunction with the first preferred embodiment 10 of the invention. The same method is used to determine distances from the second emitting transducer 9314 and the third emitting transducer 9316 to each of the first, second, and third receiving transducers 932, 934 and 936.

The fourth receiving transducer 938, as previously discussed, is fixed in location and located on the stationary reference frame 931 near the first emitting transducer 9312. The fourth receiving transducer 938 provides the means used by the inventor to adjust for the extant speed of sound in the alternate preferred embodiment 910 of the invention. Since the distance from the fourth receiving transducer 938 and the third emitting transducer 9316 is fixed and known, time taken for a wave burst 22 to travel between the third emitting transducer 9316 and the fourth receiving transducer 938 provides a measure of the extant speed of sound. In the alternate preferred embodiment of the invention, the same method and identical circuitry is used to determine the distance between the fixed fourth receiving transducer 938 and the third emitting transducer 9316 which is used to determine distance between each of the first, second and third receiving transducers 932, 934 and 936 and each of the emitting transducers 9312, 9314 and 9316. Of course, a less sophisticated method might also be employed in this part of the process, since that part of the circuitry described herein which is involved with compensation for variable distance is not really required for this one measurement.

Figure 10:
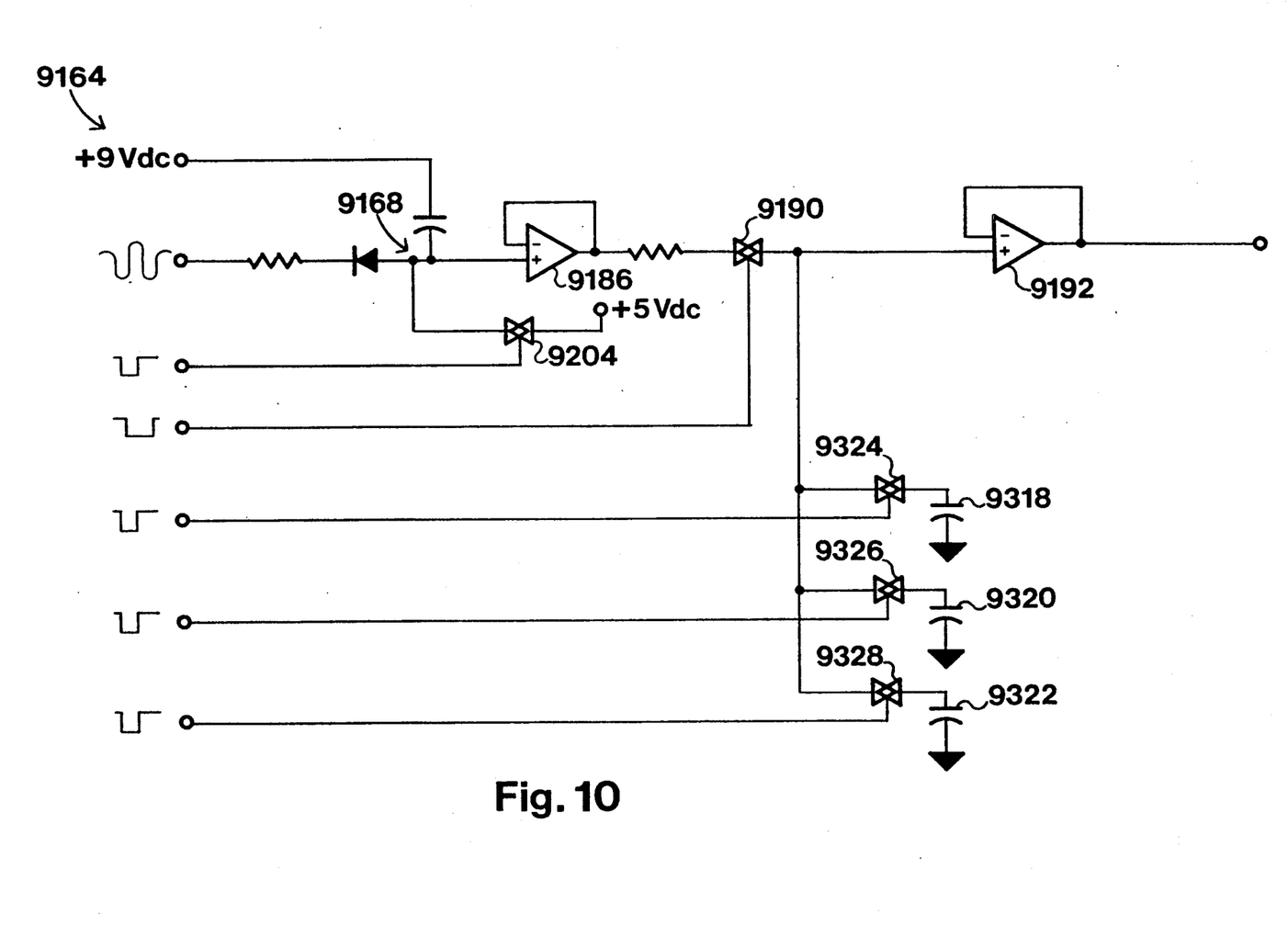
FIG. 10 is a schematic diagram of an analog sample and store section as used in the equally preferred alternate embodiment of the present invention.

With the exception of the differences specifically described herein, the alternate preferred embodiment 910 of the invention uses the same circuitry and functions in much the same manner as does the first preferred embodiment 10. Means to provide the additional timing signals employed in the alternate preferred embodiment 910 and means to store additional distance timing data and to manipulate such data arithmetically to calculate position are all entirely within the knowledge of one skilled in the art. However, one skilled in the art will notice that a modification of the sample and hold 164 (FIG. 4) utilized in conjunction with the first preferred embodiment 10 will enable the operation of the alternate preferred embodiment 910. As described herein, the analog signal processing unit 944 utilizes a signal level derived from the magnitude of a just previous wave burst 22, which magnitude is dependent upon distance between the distance between that pair of the first, second and third receiving transducers 932, 934 and 936 and the emitting transducers 9312, 9314 and 9316 which is of instant concern. Therefore, a means is provided to store such information relating to wave bursts 22 emitted from each of the emitting transducers 9312, 9314 and 9316 within the analog signal processing units 944. A modified sample and hold unit 9164, as is used in the alternate preferred embodiment 910 of the invention, is depicted in schematic form in FIG. 10. Construction of the modified sample and hold unit 9164 is similar to that of the sample and hold 164. A peak detector circuit 9168, a first high impedance unity gain buffer amplifier 9186, an output coupling switch 9190, a second high impedance unity gain buffer amplifier 9192 and a dump switch 9204 function as do the corresponding parts 168, 186 190, 192 and 204 in the sample and hold 164 (FIG. 4). However, as is shown in FIG. 10, the modified sample and hold 9164 has a first hold capacitor 9318, a second hold capacitor 9320, a third hold capacitor 9322, a first select switch 9324, a second select switch 9326 and a third select switch 9328. When timing signal is applied to the output coupling switch and to the first select switch 9324 simultaneously, the first hold capacitor 9318 is allowed to charge to the level of just detected by the peak detector circuit 9168 which, of course, is timed to occur just after a wave burst 22 (FIG. 2) from the first emitting transducer 9132 is received. Similarly, signal levels corresponding to wave bursts 22 from the second emitting transducer 9314 and the third emitting transducer 9316 are stored on the second hold capacitor 9320 and the third holding capacitor 9322. After processing of each wave burst 22 is completed, charge remaining within the peak detector circuit 9168 is dumped through the dump switch 9204 and, just as was described in more detail in relation to the first preferred embodiment 10 of the invention, when each wave burst 22 is being processed, the output coupling switch is closed, and the appropriate select switch 9324, 9326 or 9328 is opened such that charge level coupled through the second high impedance buffer amplifier 9192 is representative of results obtained from a just previous wave burst 22 magnitude from the corresponding emitting transducer 9312, 9314 or 9316 as seen by the receiving transducer 932, 934 or 936 to which the particular sample and hold 9164 in question is connected.

Of course, the alternative embodiment 910 of the invention, could be provided with switches (not shown) such as the switches 16 shown in FIG. 1 as being employed with the first preferred embodiment 10 of the invention.

As is shown above, in great part, the ultrasonic position determining devices 10 and 910 according to the present invention closely resemble prior art conventional position determining devices in many respects. The substantial difference exists in the inclusion of means for identifying a particular cycle of an ultrasonic burst and then for identifying a particular point on that cycle. No significant changes of materials are envisioned nor are any special constructions required.

Various modifications may be made to the invention without altering its value or scope. For example, while embodiments of the invention described here have shown the inventive method being used to determine position to three and six degrees of freedom, respectively, the advantages of increased resolution according to the present invention can be fully utilized in devices requiring only two dimensional analysis.

While the present invention has been described here as using movable markers which are connected by wire to the remaining components of the device, any conventional means of wireless operation, such as infrared signal transmission, could be employed to make the marker into a "wireless" device.

Similarly, the direction of travel of ultrasonic waves between movable markers and fixed reference locations is does not affect resultant distance measurements. Therefore, with some minor modifications, the embodiments of the present invention described could be altered to reverse the directions of travel of such waves from that herein disclosed.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

Ultrasonic position locating devices are widely used as computer data input devices. The predominant current usages are for controlling the position of a curser on a computer screen to enable user interface with software, and to provide information about relative physical locations, as for digitizing aspects of a drawing. Additionally, applications for such devices are expanding very rapidly. Contemporary efforts to improve "virtual reality" systems, wherein users interface with a computer created environment, have created an increased need for improved position locating means.

The ultrasonic position locating devices of the present invention may be utilized in any application wherein conventional digital computer input position locating devises are used. In addition, the increased precision of the inventive device and method will allow the present invention to find application wherein the positional interpretation of data input has heretofore been insufficiently accurate. The main area of improvement is in the ability of the present inventive method and devices to accurately measure the distance between a movable marker and a plurality of stationary reference points.

Since the ultrasonic position locating devices of the present invention may be readily constructed and are compatible with prior art conventional positional locating methods, it is expected that they will be acceptable in the industry as substitutes for the conventional positional locating data input devices. Also, it is anticipated that the increased accuracy of the inventive devices will allow application of the inventive devices to data input applications wherein conventional positional input devices have been found to be insufficiently precise for practical application. For these and other reasons, it is expected that the utility and industrial applicability of the invention will be both significant in scope and long-lasting in duration.

I claim:
1. A method for measuring a distance, comprising:
    a. causing an acoustic disturbance to be emitted from a first distance reference, said acoustic disturbance consisting of a plurality of individual wave cycles;
    b. causing a high speed counter to be started at a counter start time, said counter start time having a fixed temporal relationship to an instant of emission of said acoustic disturbance;
    c. intercepting said acoustic disturbance at a second distance reference, and converting said acoustic disturbance into an equivalent electrical signal;
    d. identifying a reference cycle of said individual wave cycles within said equivalent electrical signal, wherein said reference cycle is immediately preceded by a reference cycle of a lower amplitude;
    e. identifying a reference point on said reference cycle;
    f. stopping said high speed counter when said reference point on said reference wave cycle is encountered; and
    g. calculating said distance based upon a reading of said high speed counter.
2. The method of claim 1, wherein:
    said individual wave cycles of said acoustic disturbance are repeated at a frequency above the range of human hearing.
3. The method of claim 1, wherein:

said individual wave cycles are of unequal magnitudes; and said reference cycle is identified by the characteristic of being similar in magnitude to a corresponding cycle of a just previous acoustic disturbance.

4. A method for measuring a distance, comprising:
a. causing an acoustic disturbance to be emitted from a first distance reference, said acoustic disturbance consisting of a plurality of individual wave cycles;
b. causing a high speed counter to be started at a counter start time, said counter start time having a fixed temporal relationship to an instant of emission of said acoustic disturbance;
c. Intercepting said acoustic disturbance at a second distance reference, and converting said acoustic disturbance into an equivalent electrical signal;
d. identifying a reference cycle of said individual wave cycles within said equivalent electrical signal;
e. identifying a reference point on said reference cycle;
f. stopping said high speed counter when said reference point on said reference wave cycle is encountered; and
g. calculating said distance based upon a reading of said high speed counter, wherein said individual wave cycles are of unequal magnitudes, and said reference cycle is identified by the characteristic of being similar in magnitude to a corresponding cycle of a just previous acoustic disturbance, wherein:

said reference cycle is a second cycle of said acoustic disturbance, and said reference cycle is identified by the characteristic of being greater in magnitude than a first cycle and lesser in magnitude than a third cycle, said first cycle and said third cycle being the first and third of said individual wave cycles of a just previous acoustic disturbance.

5. The method of claim 1, wherein:
said reference point is a zero crossing point at the intermediate end of said reference cycle, the zero crossing point being defined as being that point in a sine wave wherein an instantaneous slope of amplitude of said reference cycle plotted against time is essentially perpendicular to a time axis.

6. An apparatus for locating a position of a movable marker, including:
a plurality of transmitting means, each for transmitting an ultrasonic wave burst;
a plurality of receiving means, each for receiving the ultrasonic wave burst from each of the transmitting means;
reference point identification means for identifying a specific cycle within each ultrasonic wave burst and further for identifying a specific reference point within said specific cycle;
timing means for measuring a propagation time of each ultrasonic wave burst between one of the transmitting means and one of the receiving means, said propagation time being time elapsed between transmission of each ultrasonic wave burst from one of the transmitting means and reception of said specific reference point on said wave burst at one of the receiving means; and
distance calculating means for calculating distances between one of the transmitting means and one of the receiving means based upon said propagation time and a known speed of sound; and
calculating means for performing basic trigonometric calculations to determine the position and attitude of the movable marker with respect to the apparatus using as variables the distances calculated by the distance calculating means.

7. The apparatus of claim 6, wherein:
each ultrasonic wave burst which is transmitted from one of the transmitting means is received at each of the receiving means; thus providing an indication of distances between the transmitting means and each of the receiving means.

8. The apparatus of claim 6, wherein:
said ultrasonic wave bursts are transmitted sequentially from each of the transmitting means and each of the ultrasonic wave bursts is received at each of the receiving means, thus providing an indication of distances between the receiving means and each of the transmitting means.

9. The apparatus of claim 6, and further including:
compensation means for compensating for variations in an extant speed of sound, said compensation means including three fixed reference points and a movable reference point, such that differences in propagation times of the ultrasonic wave bursts between said movable reference point and each of said fixed reference points will provide sufficient data to calculate said extant speed of sound.

10. An apparatus for locating a position of a movable marker, including:
a plurality of distance measuring means, each of said distance measuring means including;
transmitting means for transmitting an ultrasonic wave burst;
receiving means for receiving the ultrasonic wave burst;
reference point identification means for identifying a specific cycle within said ultrasonic wave burst and further for identifying a specific reference point within said specific cycle;
timing means for measuring a propagation time of said ultrasonic wave burst between the transmitting means and the receiving means, said propagation time being time elapsed between transmission of said ultrasonic wave burst from said transmitting means and reception of said specific reference point on said wave burst at said receiving means; and
distance calculating means for calculating distances between the transmitting means and the receiving means based upon said propagation time and a known speed of sound;
position calculating means for performing basic trigonometric calculations to determine the position of the movable marker with respect to the apparatus using as variables the distances calculated by the distance calculating means;
compensation means for compensating for variations in an extant speed of sound, said compensation means including three fixed reference points and a movable reference point, such that differences in propagation times of the ultrasonic wave burst between said movable reference point and each of said fixed reference points will provide sufficient data to calculate said extant speed of sound wherein said three fixed reference points are positioned to be colinear.

11. An apparatus for locating a position of a movable marker, including:
  a plurality of distance measuring means, each of said distance measuring means including:
    transmitting means for transmitting an ultrasonic wave burst;
    receiving means for receiving the ultrasonic wave burst;
    reference point identification means for identifying a specific cycle within said ultrasonic wave burst and further for identifying a specific reference point within said specific cycle;
    timing means for measuring a propagation time of said ultrasonic wave burst between the transmitting means and the receiving means, said propagation time being time elapsed between transmission of said ultrasonic wave burst from said transmitting means and reception of said specific reference point on said wave burst at said receiving means; and
    distance calculating means for calculating distances between the transmitting means and the receiving means based upon said propagation time and a known speed of sound;
  position calculating means for performing basic trigonometric calculations to determine the position of the movable marker with respect to the apparatus using as variables the distances calculated by the distance calculating means;
  compensation means for compensating for variations in an extant speed of sound, said compensation means including three fixed reference points and a movable reference point, such that differences in propagation times of the ultrasonic wave bursts between said movable reference point and each of said fixed reference points will provide sufficient data to calculate said extant speed of sound, wherein the receiving means are located at the movable reference point, and the ultrasonic wave emitters are located at the fixed reference point.

12. The apparatus of claim 9, wherein:
  the transmitting means are located at the movable reference point, and the ultrasonic wave receivers are located at the fixed reference points.

13. The apparatus of claim 6, and further including:
  compensation means for compensating for variations in an extant speed of sound, said compensation means including a supplemental receiving device located at a known fixed distance from a reference pulse emitting means such that any variations in propagation time of the ultrasonic wave burst between the reference pulse emitting means and the supplemental receiving means is entirely attributable to variations in the extant speed of sound.

14. The apparatus of claim 13, wherein:
  the reference pulse emitting means is also one of said transmitting means.

15. In an ultrasonic position locating device including a plurality of ultrasonic wave transmitting means, a plurality of ultrasonic wave receiving means, a plurality of counter means, each of which is started when an ultrasonic wave burst is emitted from one of the transmitting means and is stopped when the ultrasonic wave burst is received at a corresponding receiving means, and calculating means for calculating distance based upon the output of the counter means, the improvement comprising:
  a fixed reference frame having three fixed reference points said fixed reference points having a known fixed physical relationship to each other, and a movable marker having thereon three marker points having a known fixed relationship to each other, the movable marker being movable in three physical dimensions in relation to the fixed reference frame, such that when all distances between each of the fixed reference points and each of the marker points is calculated the positional attitude of the movable marker is determinable in addition to the position of the movable marker relative to the fixed reference frame.

16. The improvement of claim 15, wherein:
  said ultrasonic wave transmitting means are respectively situated at said three fixed reference points, and said ultrasonic wave receiving means are respectively situated at said three marker points.

17. The improvement of claim 15, wherein:
  said ultrasonic wave receiving means are respectively situated at said three fixed reference points, and said ultrasonic wave transmitting means are respectively located at said three marker points.

18. The improvement of claim 17, and further including:
  supplemental receiving means for providing data for calculating an extant speed of sound, located at a known fixed position on the fixed reference frame such that propagation time of the ultrasonic wave burst from one of the transmitting means to the supplemental receiving means is inversely proportional to the extant speed of sound.

19. The improvement of claim 15, and further including:
  reference cycle identification means for identifying a specific reference cycle within a received signal;
  reference point identification means for identifying a reference point on said reference cycle; and
  clock stop pulse generating means connected to said reference cycle identification means and said reference point identification means such that when said reference cycle is encountered in the received signal and, subsequently, the reference point is encountered, a clock stop pulse is generated which stops the counter means such that the counter means is stopped coincidentally with reception of said reference point within said reference cycle of each successive ultrasonic wave burst.

20. The improvement of claim 19, wherein:
  the reference cycle is identified by the characteristic of being similar in magnitude to a corresponding cycle of a just previous wave burst.

21. An input device for a computer comprising:
  means for transmitting acoustic signals from at least three points in a first region;
  means for receiving said transmitted signals at least three points in a second region; and
  means, operably coupled to the transmitting means and the receiving means, for providing the computer a distance and attitudinal orientation between the transmitting means and the receiving means.

22. The device of claim 21, wherein said transmitted signals includes acoustic signals.

23. The device of claim 22, wherein the providing means includes a means for calculating a propagation time for each signal and a known speed of sound.

24. The device of claim 21, wherein the receiving means includes three ultrasonic receivers.

25. The device of claim 21, wherein the providing means includes a means for determining yaw, roll, and pitch orientations between the transmitting means and the receiving means.

26. An input device for a computer comprising:

stationary transducer means;

movable transducer means;

means for propagating signals from one of the transducer means to the other; and control means, operably coupled to the stationary and the movable transducer means, for providing the computer with a relative position and an attitude of at least one of the transducer means relative to the other, based on propagation delays of the signals.

27. The device of claim 26, wherein the propagating means include means for propagating signals from the stationary transducer means to the movable transducer means.

28. The device of claim 26, wherein the propagating means include means for propagating signals from the movable transducer means to the stationary transducer means.

29. The device of claim 26, wherein the stationary transducer means includes a first plurality of transducers arranged on a stationary frame and the movable transducer means includes a second plurality of transducers arranged on a pointing member.

30. The device of claim 26, wherein at least one of the transducer means includes at least three transducers.

31. The device of claim 26, wherein the stationary and the movable transducer means each includes at least three transducers.

32. The device of claim 26, wherein the attitude includes yaw, pitch, and roll information.

33. The device of claim 26, wherein the signals include ultrasonic wave bursts.

* * * * *